US00RE44785E

(19) United States
(12) Reissued Patent
Howell et al.

(10) Patent Number: US RE44,785 E
(45) Date of Reissued Patent: Mar. 4, 2014

(54) IMMOBILIZATION SYSTEM FOR MOTOR VEHICLES

(75) Inventors: Steven Christopher Howell, Rugby (GB); Nigel Clark, Rugby (GB)

(73) Assignee: Jaguar Land Rover Limited, Coventry (GB)

(21) Appl. No.: 12/410,128

(22) Filed: Mar. 24, 2009

Related U.S. Patent Documents

Reissue of:
(64) Patent No.: 6,040,638
Issued: Mar. 21, 2000
Appl. No.: 09/170,379
Filed: Oct. 13, 1998

(30) Foreign Application Priority Data

Oct. 15, 1997 (GB) ..... 9721777

(51) Int. Cl.
*B60R 25/00* (2013.01)

(52) U.S. Cl.
USPC ..... 307/10.2; 70/237; 70/255; 70/256; 123/198 D; 180/287

(58) Field of Classification Search
USPC ..... 307/9.1, 10.1, 10.2; 340/426.1, 426.24, 340/426.28; 70/225–226, 237, 255, 256; 180/287; 123/198 D
See application file for complete search history.

(56) References Cited

U.S. PATENT DOCUMENTS

| | | | | |
|---|---|---|---|---|
| 3,887,029 A | | 6/1975 | Lipschutz et al. | |
| 4,119,171 A | * | 10/1978 | Remontet | 180/287 |
| 4,533,016 A | | 8/1985 | Betton | 180/287 |
| 4,638,882 A | * | 1/1987 | Sato | 180/287 |
| 5,124,565 A | | 6/1992 | Yoshida et al. | |
| 5,191,228 A | * | 3/1993 | Sloan | 307/10.3 |
| 5,757,773 A | * | 5/1998 | Tsuji | 370/241 |
| 5,818,330 A | | 10/1998 | Schweiger | |

FOREIGN PATENT DOCUMENTS

| | | | |
|---|---|---|---|
| DE | 2517723 | A1 | 11/1976 |
| DE | 3137260 | A1 | 4/1983 |
| DE | 4019478 | A1 | 1/1991 |
| DE | 19630747 | C1 | 9/1997 |
| EP | 0154306 | A2 | 9/1985 |
| EP | 0158354 | A2 | 10/1985 |
| EP | 0733523 | B1 | 9/1996 |
| EP | 0733526 | B1 | 7/2001 |
| GB | 2108189 | A | 5/1983 |

OTHER PUBLICATIONS

Opposition against European Patent EP 0909685, Jul. 26, 2005, 21 pages.

(Continued)

*Primary Examiner* — Fritz M Fleming
(74) *Attorney, Agent, or Firm* — Brooks Kushman P.C.

(57) ABSTRACT

A vehicle immobilization system has an electronically controlled locking mechanism which requires interconnection with an electrical supply for it to be switched between a locked state and an unlocked state. The locking mechanism remains in the state to which it is switched when disconnected from the electrical supply. The immobilization system includes control means which operates to connect the locking mechanism to the electrical supply to switch it from one state to the other, and to disconnect the locking mechanism from the electrical supply when the vehicle engine is running or the vehicle is moving. The immobilization system also includes means to prevent cranking of the engine when the locking mechanism is in it's locked state.

14 Claims, 2 Drawing Sheets

(56) References Cited

OTHER PUBLICATIONS

Commission Directive 95/56/EC, OJ L 286, Nov. 8, 1995, 45 pages.
"Vehicle Data Of A Delivered Vehicle", Dec. 15, 2004.
"Detailed Drawing Of Steering Lock Parts No. A 208 462 0130."
"Delivery Note For Steering Lock Parts No.", dated Apr. 15, 1997.
"Overview of Delivery Calls For Delivery Note No. 32746", dated Apr. 15, 1997.
"Block Circuit Diagram Of System EZS-ELV".
"Specification for Requirements for System Safety Function".
"Schedule of Specification for Electric Steering Lock for 208 Series", Dec. 13, 1997, pp. 1-17.

* cited by examiner

IMMOBILIZATION SYSTEM FOR MOTOR VEHICLES

Matter enclosed in heavy brackets [ ] appears in the original patent but forms no part of this reissue specification; matter printed in italics indicates the additions made by reissue.

BACKGROUND OF THE INVENTION

The present invention relates to an immobilization system for a motor vehicle.

Motor vehicles have been conventionally immobilized by means of a steering column lock in which rotation of a lock barrel using a key mechanically locks and unlocks the steering column. Such mechanisms are by nature accessible and may relatively easily be overcome by forcing the lock.

The present invention relates to a mechanical immobilization system with an additional electronic locking device remote from the mechanical key means. The use of remote electronic locking in this manner will enable the electronic locking device to be located in a relatively inaccessible location thereby improving the security of the vehicle. The electronic locking device may be arranged to lock any component which must move during driving of the vehicle, for example, the steering column, the transmission, or the gear box of the vehicle.

When using remote locking mechanisms in this manner, it is essential that the locking mechanism is disabled while the vehicle engine is running and/or the vehicle is moving, so that the immobilization system cannot be inadvertently locked under such conditions.

SUMMARY OF THE INVENTION

According to one aspect of the present invention, a vehicle immobilization system comprises an electronically controlled locking mechanism. The electronically controlled locking mechanism requires an electrical supply to switch between a locked state and an unlocked state. The locking mechanism remains in the state to which it is switched when disconnected from the electrical supply. The immobilization system includes control means for connecting the locking mechanism to an electrical supply to switch it from one state to the other and for disconnecting the locking mechanism from the electrical supply when the vehicle engine is running or the vehicle is moving. The immobilization system also includes means to prevent cranking of the engine when the locking mechanism is in its locked state.

According to a preferred embodiment, the vehicle immobilization system control means is multiplexed with other electronic control systems of the vehicle. Both the live and ground supplies to the locking mechanism are preferably disconnected to prevent it from switching.

DETAILED DESCRIPTION OF PREFERRED EMBODIMENTS

Figure 1:
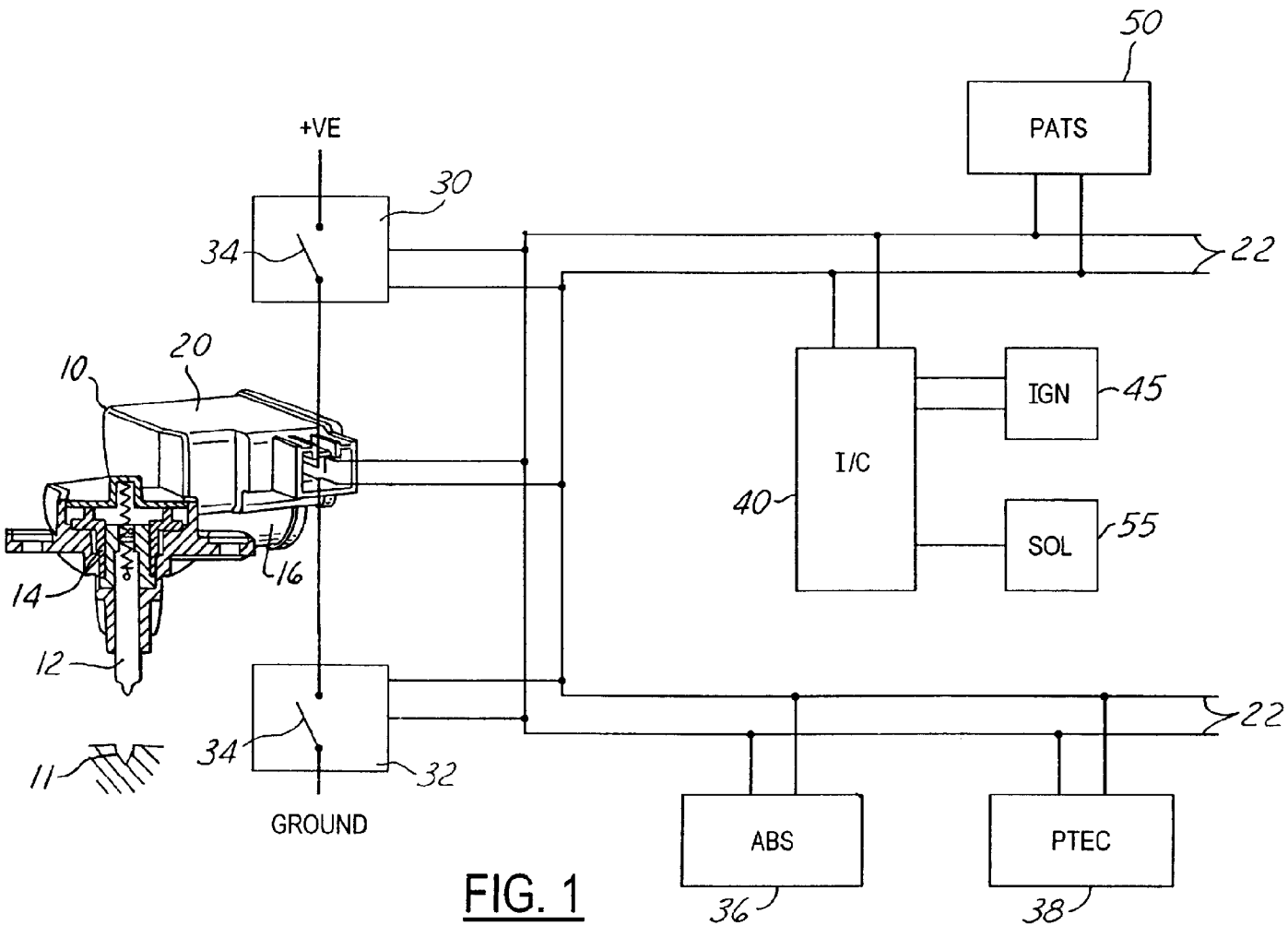
FIG. 1 is a diagrammatic illustration of a remote-controlled immobilization system in accordance with the present invention.

As illustrated in FIG. 1, an immobilization system for a motor vehicle comprises a remote steering column lock (SCL) 10. The steering column lock 10 comprises a locking pin 12 which is moved linearly, into and out of engagement with a detent 11 on the steering column of the vehicle. The locking pin 12 has a screw thread formation which engages a corresponding thread on a nut member 14. The nut member 14 is rotated by means of a worm and pinion drive, by an electric motor 16.

The steering column lock 10 includes an electronic control module 20. Electronic control module 20 includes means for sensing when the locking pin 12 is in a locked or unlocked position and a means for powering the electric motor 16 to drive in one direction or the other, upon receipt of a 'Lock' or an 'Unlock' command. Electronic control module 20 is connected to a multiplex bus 22 of the motor vehicle, from which it receives command messages to lock or unlock the steering column and to which it transmits messages on the status of the steering column lock, namely 'Status locked'; 'Status unlocked'; 'Status in progress'; and 'Status faulted' (as indicated in FIG. 2).

Steering column lock 10 is connected to a positive electrical supply (+VE) and to the ground of the vehicle, via a rear electronic module (REM) 30 and a general electronic module (GEM) 32, respectively. Electronic modules 30 and 32 each have switch means 34 by which the steering column lock 10 may be isolated from the vehicle positive electrical supply and ground. The modules 30 and 32 are also connected to multiplex bus 22.

Figure 2:
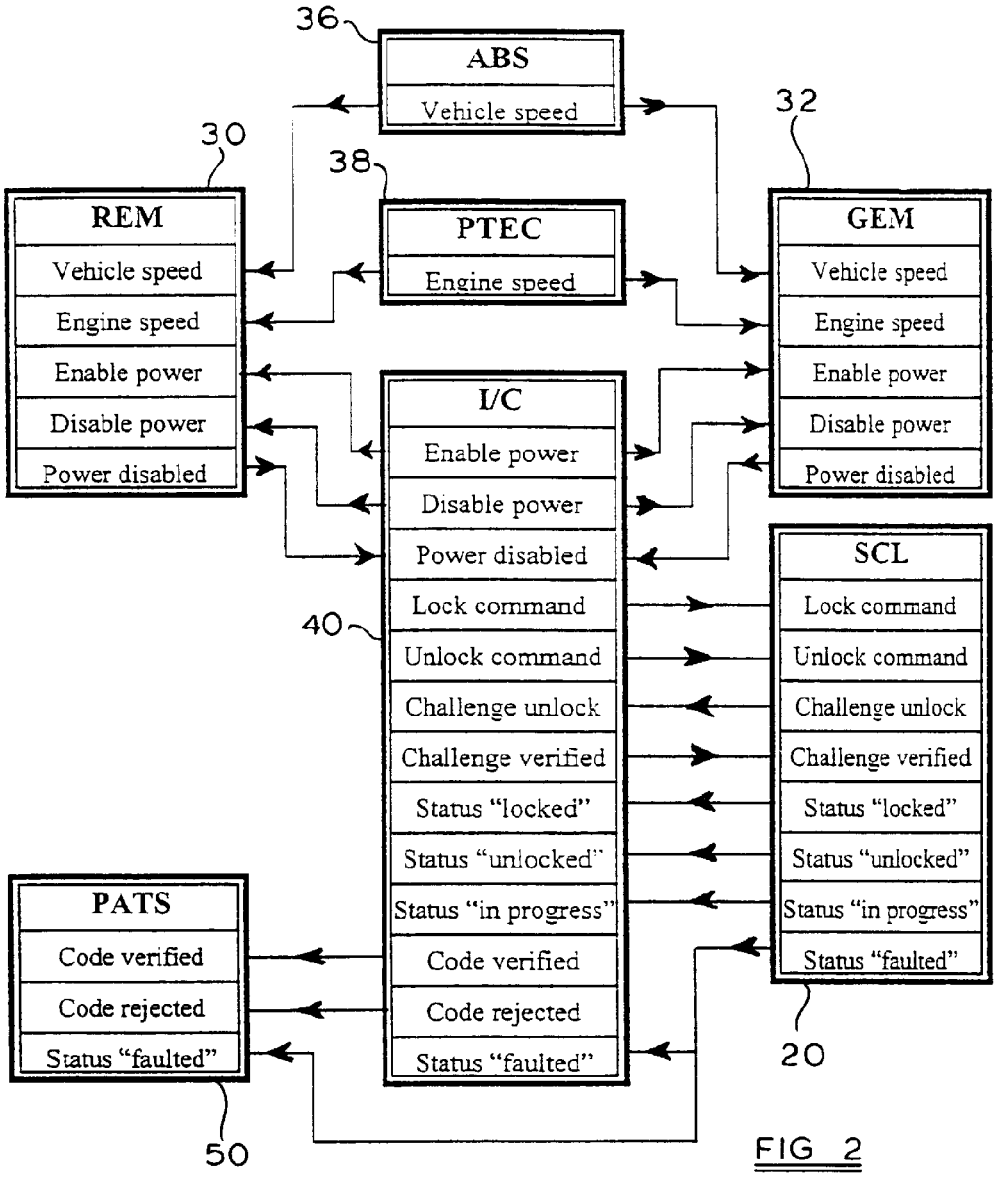
FIG. 2 illustrates diagrammatically the flow of data messages between the various components of the system illustrated in FIG. 1.

As illustrated in FIG. 2, modules 30 and 32 may receive messages from multiplex bus 22 including (i) to 'Enable power', in response to which they will close switch means 34; and (ii) to 'Disable power', in response to which they will open switch means 34. Modules 30 and 32 also receive 'Vehicle speed' messages from the vehicle's Antilock Braking System (ABS) 36 and 'Engine speed' messages from the Powertrain Control Module (PTEC) 38 via multiplex bus 22. Modules 30 and 32 further transmit a 'Power disabled' message to the multiplex bus 22 when the switch means 34 are open.

Steering column lock 10 is under the overall control of the vehicle's instrument cluster module (I/C) 40, via multiplex bus 22.

As illustrated in FIG. 2, instrument cluster module 40 transmits command messages 'Enable power'; 'Disable power'; 'Unlock command'; and 'Lock command' to multiplex bus 22 and receives the status messages 'Power disabled'; 'Status locked'; 'Status unlocked'; 'Status in progress'; and 'Status faulted' from multiplex bus 22. Instrument cluster module 40 is hardwired to vehicle ignition switch 45 from which it receives signals when the ignition key is inserted, when the key is turned in ignition switch 45 to crank the engine, and when the key is removed from ignition switch 45.

The ignition key includes a transponder which, when inserted into the ignition switch 45, generates a security code that is transmitted to instrument cluster module [10] *40*. Instrument cluster module [10] *40* processes the security code and transmits a 'Code verified' message if the correct security code is received or a 'Code rejected' message if the security code is incorrect to a passive antitheft system (PATS) 50, via multiplex bus 22. Passive antitheft system 50 also receives 'Status faulted' messages from multiplex bus 22.

The vehicle's ignition relay (SOL) 55 is hardwired to instrument cluster module 40. Instrument cluster module 40 includes means to prevent cranking of the engine when it receives the 'Status locked' message and to enable cranking of the engine when it receives the 'Status unlocked' message.

With the immobilization system described above, when the steering column lock 10 is engaged and the ignition key has been removed from the ignition switch 45, the steering lock 10 will be isolated from the vehicle's positive electrical supply and ground by modules 30 and 32.

To unlock steering column 10, the ignition key is inserted into the ignition switch 45 which will generate a 'Key insert' signal and a security 'code' signal which are transmitted to instrument cluster module 40.

Upon receipt of the 'Key insert' signal, instrument cluster module 40 generates an 'Enable power' message which is transmitted to modules 30 and 32 via multiplex bus 22. Upon receipt of the 'Enable power' message, switches 34 of modules 30 and 32 will close, thereby connecting steering column lock 10 to the positive electrical supply and ground provided that no vehicle speed or engine speed are detected. Steering column lock module 20 will then generate a 'Status locked' message and transmit this message over multiplex bus 22.

Upon receipt of the 'code' signal transmitted by the key in ignition switch 45, instrument cluster module 40 will check the code. If the code is correct, module 40 will transmit a 'Code verified' message over multiplex bus 22. If an incorrect 'code' message is received, instrument cluster module 40 will transmit a 'Code rejected' message to passive antitheft module 50 which will follow its normal theft procedure.

After instrument cluster module 40 has generated the 'Code verified' message and received the 'Status locked' message, it transmits an 'Unlock command' message to steering column lock module 20 via multiplex bus 22. Upon receipt of the 'Unlock command' message, steering column lock module 20 will generate a 'Challenge unlock' message and transmit it to instrument cluster module 40 via multiplex bus 22. If the 'Unlock command' message is genuine, instrument cluster module 40 will generate a 'Challenge verified' message and transmit it to steering column lock module 20 via multiplex bus 22. Upon receipt of the 'Challenge verified' message, steering column lock module 20 energizes electric motor 16 to cause locking pin 12 to move out of engagement with detent 11 on the steering column. As the locking pin 12 moves between its locked and its unlocked positions, steering column lock module 20 will transmit a 'Status in progress' message and when locking pin 12 reaches the limit of its movement out of engagement with detent 11 on the steering column, steering column lock module 20 will transmit a 'Status unlocked' message.

Upon receipt of the 'Status unlocked' message, instrument cluster module 40 transmits a 'Disable power' message. Receipt of this 'Disable power' message by modules 30 and 32 causes switch means 34 to open, isolating steering column lock 10 from the positive electrical supply and ground. Modules 30 and 32 then transmit a 'Power disabled' message.

When the 'Status unlocked' and 'Power disabled' messages are received by instrument cluster module 40, it will be enabled to permit cranking of the engine in response to turning of the key in ignition switch 45.

If the security code is rejected by instrument cluster module 40, it transmits a 'Disable power' message causing the modules 30 and 32 to disconnect steering column lock 10 from the power supply, without disengaging the locking pin 12 from detent 11 on the steering column.

To lock the steering column, the ignition key is removed from the ignition switch 45. Upon removal of the key, instrument cluster module 40 transmits an 'Enable power' message to multiplex bus 22.

Upon receipt of the 'Enable power' message and provided that the 'Vehicle speed' and 'Engine speed' messages from the antilock braking system 36 and the powertrain electronic control module 38 indicate that the vehicle is stationary and/or the engine is stopped, modules 30 and 32 will connect steering column lock 10 to the power supply. Steering column lock module 20 will then transmit the 'Status unlocked' message to multiplex bus 22. Upon receipt of the 'Status unlocked' message, instrument cluster module 40 transmits a 'Lock command' message.

Upon receipt of the 'Lock command' message by steering column lock module 20, electric motor 16 is driven moving locking pin 12 into engagement with detent 11 on the steering column. When locked, steering column lock module 20 transmits a 'Status locked' message, in turn causing instrument cluster module 40 to transmit a 'Disable power' message and also disabling ignition relay 55.

Receipt of the 'Disable power' message will cause modules 30 and 32 to isolate steering column lock 10 from the power supply and transmit a 'Power disabled' message as described above.

If steering column lock 10 fails to go from one state to another within a specified time limit, steering column lock 10 will transmit a 'Status faulted' message which, upon receipt by instrument cluster module 40, will activate an alarm or warning message on the instrument cluster.

The immobilization system disclosed above provides means by which the locking mechanism is only energized during the time that it is switching from one state to another, thereby avoiding inadvertent locking or unlocking of the mechanism. Furthermore, the system prevents locking of the system when the vehicle is in motion or the engine is running. It also prevents cranking of the engine when the system is locked.

Various modifications may be made without departing from the invention. For example, while in the above embodiment a pair of modules 30 and 32 are used to disconnect the steering column lock from both the positive electrical supply and ground, it is also possible to use a single module to disconnect the positive electrical supply only or to disconnect both the positive electrical supply and ground.

While the embodiment described above relates to a steering column lock, the locking mechanism may be used to lock any component which must be moved to drive the vehicle or which will move while the vehicle is in motion.

It will be appreciated that while in the above description reference is made to the positive electrical supply of the vehicle, the invention will relate equally to the negative electrical supply of vehicles with a positive ground.

What is claimed is:

1. A vehicle immobilization system for a vehicle, said vehicle having an on/off switch and an engine, said vehicle immobilization system comprising:

an electronically controlled locking mechanism responsive to a remote command signal to move between a locked state and an unlocked state, said electronically controlled locking mechanism requiring an electrical supply to move in either direction between said locked state and said unlocked state, such that said electronically controlled locking mechanism remains in its current locked or unlocked state whenever disconnected from said electrical supply;

switch means for selectably connecting *and disconnecting* said electronically controlled locking mechanism to *and from* said electrical supply in response to an enable power command and a disable power command *and for receiving an engine speed message and a vehicle speed message*; and control means coupled to said electronically controlled locking mechanism and said switch means, said control means generating said enable power command in response to activity of said on/off switch and preventing said enable power command when said engine is running or when said vehicle is moving,

*wherein said control means is operably coupled to said electronically controlled locking mechanism and to said switch means by a multiplex bus, said control means transmitting said enable power command on said multiplex bus to said switch means in response to activity of said on/off switch and said switch means receiving said engine speed message and said vehicle speed message on said multiplex bus and failing to respond to said enable power command unless said engine speed message indicates said engine is stopped and said vehicle speed message indicates said vehicle is not moving, and*

*wherein said switch means disconnects said electronically controlled locking mechanism from both live and ground sides of said electrical supply in response to said disable power command.*

2. A vehicle immobilization system according to claim 1 said switch means selectably connects [or disconnects] said electronically controlled locking mechanism to *said* both live and ground sides of said electrical supply *in response to said power enable command*.

3. A vehicle immobilization system according to claim 1 wherein said *electronically controlled* locking mechanism generates status messages to indicate when it is locked, unlocked, or in progress between said locked and unlocked positions.

4. A vehicle immobilization system according to claim 1 further including antitheft means for checking a security code generated by insertion of an ignition key into said on/off switch, said electronically controlled locking mechanism moving to its unlocked state only when said security code is verified.

5. A vehicle immobilization system according to claim 1 [wherein] further comprising a vehicle cranking relay for starting the engine of said vehicle, wherein said control means inhibits operation of said cranking relay when said electronically controlled locking mechanism is in its locked state.

[6. A vehicle immobilization system according to claim 2 wherein said switching means receives 'Vehicle speed' and 'Engine speed' messages and will fail to respond to said enable power command, unless said 'Vehicle speed' and 'Engine speed' messages indicate that said vehicle is not moving and said engine is stopped.]

7. A vehicle immobilization system according to claim 1 wherein said electronically controlled locking mechanism comprises an electric motor and a locking pin driven by said electric motor and having a locked position for engaging detent means associated with a component of the vehicle which must be moved to drive said vehicle or which will move when said vehicle is driven, and having an unlocked position clear of said detent means.

8. A vehicle immobilization system according to claim [5] *7* wherein said electric motor is driven to move said locking pin to its locked position upon receipt of a 'Lock' command, and to move said locking pin to its unlocked position upon receipt of an 'Unlock' command.

*9. A vehicle immobilization system according to claim 1 wherein said electronically controlled locking mechanism provides a status message indicative of a locking pin moving between a locked position and an unlocked position.*

*10. A vehicle immobilization system according to claim 9 wherein said electronically controlled locking mechanism transmits said status message on said multiplex bus.*

*11. A vehicle immobilization system according to claim 1 wherein said switch means includes a first switch module for electrically connecting and disconnecting said electronically controlled locking mechanism to and from said live side and a second switch module for electrically connecting and disconnecting said electronically controlled locking mechanism to and from said ground side.*

*12. A vehicle immobilization system for a vehicle, said vehicle having an on/off switch and an engine, said vehicle immobilization system comprising:*

*an electronically controlled locking mechanism responsive to a remote command signal to move between a locked state and an unlocked state, said electronically controlled locking mechanism requiring an electrical supply to move in either direction between said locked state and said unlocked state, such that said electronically controlled locking mechanism remains in its current locked or unlocked state whenever disconnected from said electrical supply;*

*switch means for selectably connecting and disconnecting said electronically controlled locking mechanism to and from said electrical supply in response to an enable power command and a disable power command and for receiving an engine speed message and a vehicle speed message; and*

*control means coupled to said electronically controlled locking mechanism and said switch means, said control means generating said enable power command in response to activity of said on/off switch and preventing said enable power command when said engine is running or when said vehicle is moving,*

*wherein said control means is operably coupled to said electronically controlled locking mechanism and to said switch means by a multiplex bus, said control means transmitting said enable power command on said multiplex bus to said switch means in response to activity of said on/off switch and said switch means receiving said engine speed message and said vehicle speed message on said multiplex bus and failing to respond to said enable power command unless said engine speed message indicates said engine is stopped and said vehicle speed message indicates said vehicle is not moving, and*

*wherein said electronically controlled locking mechanism provides a status message indicative of a locking pin moving between a locked position and an unlocked position.*

*13. The vehicle immobilization system according to claim 12 wherein said electronically controlled locking mechanism transmits said status message on said multiplex bus.*

*14. The vehicle immobilization system according to claim 12 wherein said switch means disconnects said electronically controlled locking mechanism from both a live side and a ground side of said electrical supply.*

*15. The vehicle immobilization system according to claim 12 wherein said switch means includes a first switch module for electrically connecting and disconnecting said electronically controlled locking mechanism to and from a live side of said electrical supply and a second switch module for electrically connecting and disconnecting said electronically controlled locking mechanism to and from a ground side of said electrical supply.*

* * * * *